Sept. 29, 1970  D. V. CRONIN  3,531,650
ELECTRO-OPTICAL TRANSDUCERS HAVING FLUIDIC SUPPORT
Filed Oct. 11, 1968  2 Sheets-Sheet 1
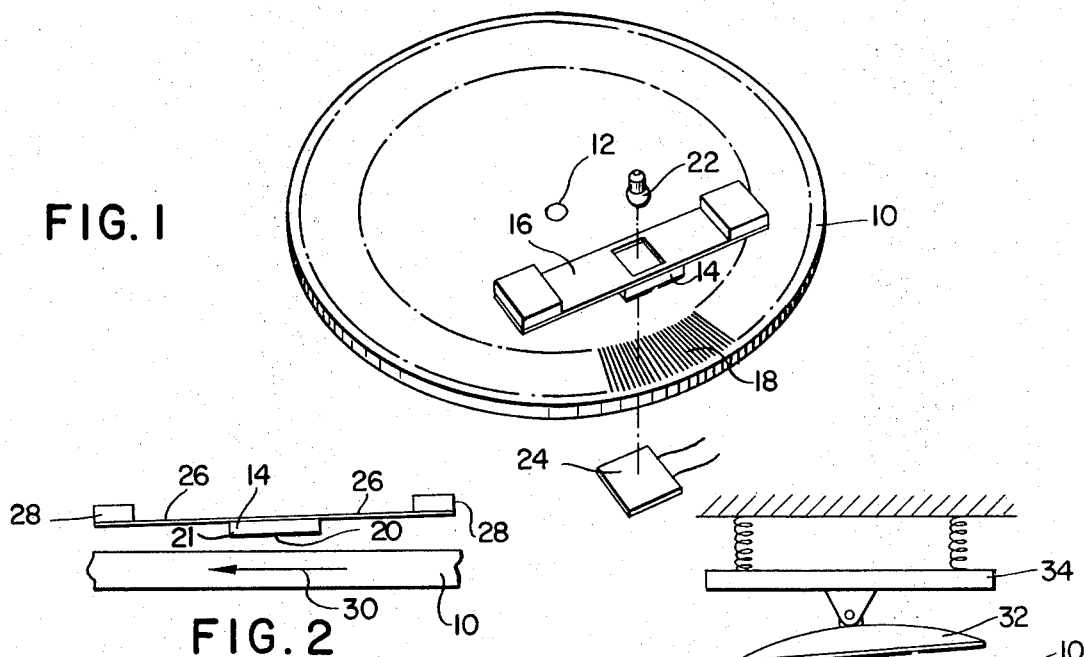
FIG. 1
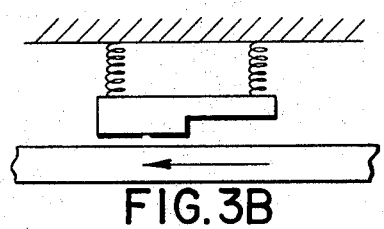
FIG. 2
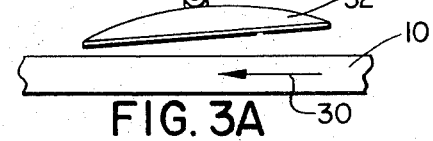
FIG. 3A
FIG. 3B
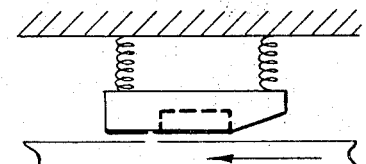
FIG. 3C
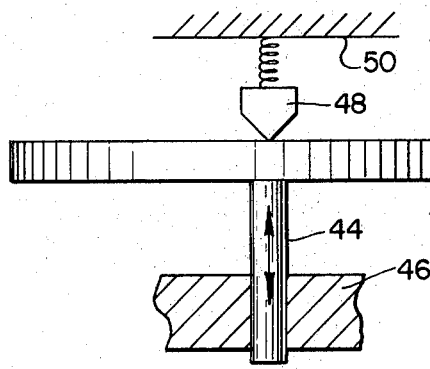
FIG. 5
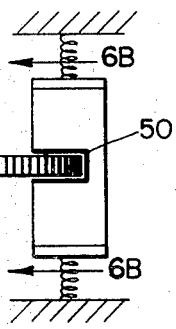
FIG. 6A
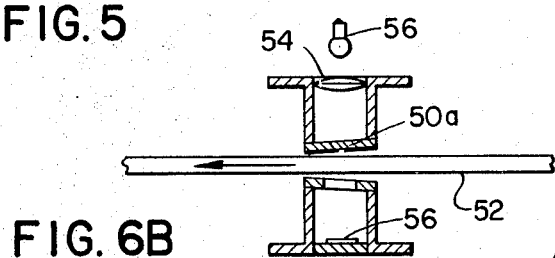
FIG. 6B
INVENTOR.
DAVID V. CRONIN
BY Joseph Weingarten
Stanley M. Schwyn
ATTORNEYS

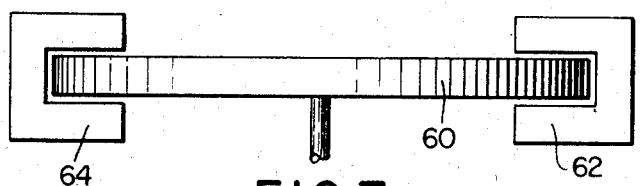
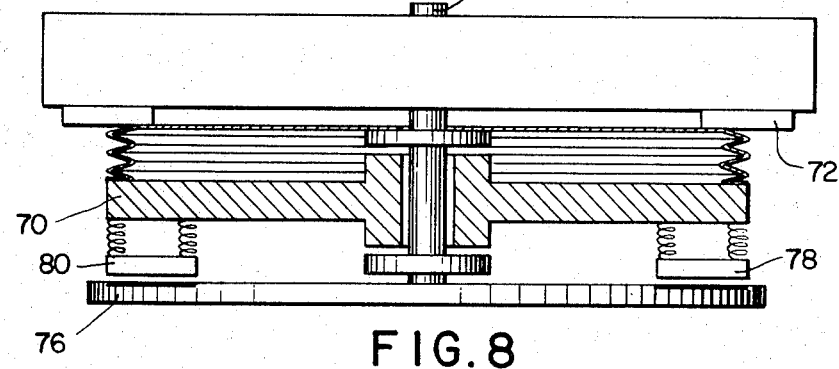
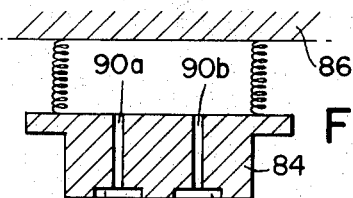
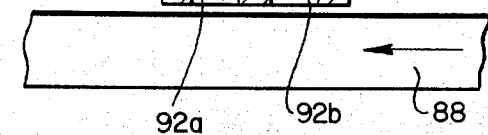
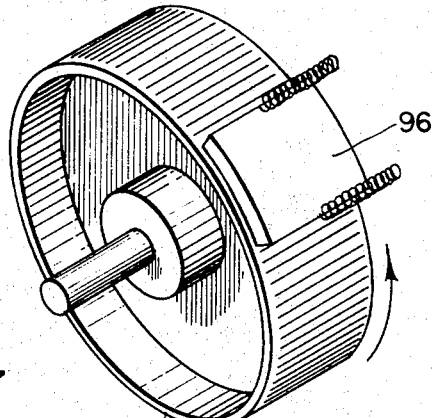
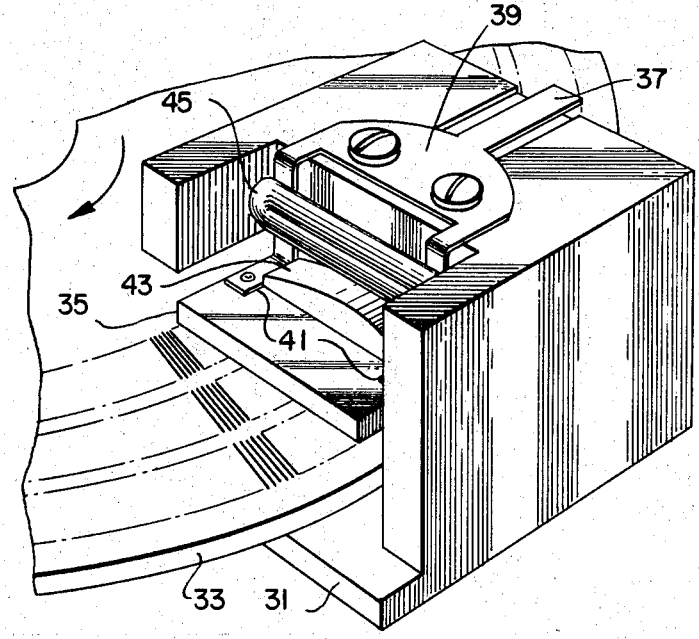

United States Patent Office

3,531,650
Patented Sept. 29, 1970

3,531,650
ELECTRO-OPTICAL TRANSDUCERS HAVING
FLUIDIC SUPPORT
David V. Cronin, West Peabody, Mass., assignor to Dynamics Research Corporation, Wilmington, Mass., a corporation of Massachusetts
Filed Oct. 11, 1968, Ser. No. 766,779
Int. Cl. G08c 9/06
U.S. Cl. 250—219                              8 Claims

ABSTRACT OF THE DISCLOSURE

A precision and relatively low cost electro-optical transducer in which irregularities in movement of a code member do not materially affect the electrical output signal. A movable code member is supported in precise spaced-apart relationship with a stationary member by means of a fluidic compliant structure operative to permit one of the members to follow spurious movement of the other, such that a precise gap is maintained between the members and distortion of the output signal minimized.

FIELD OF THE INVENTION

This invention relates to electro-optical transducers and more particularly to high accuracy electro-optical transducers having one or more code members compliantly supported therein.

BACKGROUND OF THE INVENTION

Electro-optical transducers having an optical pattern formed on a code member are widely employed as shaft or position encoders, pattern generators and read-only memories. In general, a coded optical pattern is formed on a movable code member by well-known photographic or etching techniques, the code member being mounted for movement past a stationary code member or reticle plate. On or more light sources are arranged to illuminate selected portions of the optical pattern, and photosensitive detectors are disposed in light receiving relationship with corresponding light sources, these detectors being operative to provide electrical signals representative of the position of the movable code member. In a widely employed transducer, the optical pattern is in the form of alternately light transmissive and opaque sectors formed around the periphery of a disc, this pattern cooperating with a reticle to provide, upon relative rotation of the disc and the reticle, a light pattern which varies in accordance with the angular position of the disc.

When employed as a shaft encoder, the coded pattern and the detector are such to provide an output signal, a characteristic of which varies with the angular position of the rotatable disc. For use in pattern or function generation, the code pattern and detector are such to provide an output signal which represents a particular function related to the angular position of the disc. Similarly, when employed as a read-only memory, the coded information detected at a particular angular disc position represents stored data which is unique to incremental angular positions of the rotatable disc.

In high performance electro-optical transducers, the coded pattern is formed on the disc in an extremely precise manner and the disc must be in accurate alignment with a reticle disposed adjacent the rotatable disc. To accurately decode the data content of the disc, the disc-to-reticle gap must be precisely maintained to avoid the introduction of errors in the transduced output signal due to variation in the optical path. Gap variation is caused for example by axial run-out due to skew in the rotational axis, bearing play and non-planar facing of the coded disc.

Electro-optical transducers are also constructed with the optical pattern formed on the peripheral surface of a rotatable drum, with the reticle spaced from this surface in alignment with the optical pattern. Error in the readout of this drum type of transducer can be caused by eccentricity of the drum or its rotatable support or irregularity of the drum surface. In a further form of transducer, a linear code member is employed having a suitable optical pattern along the length thereof. One or more reticles are closely spaced adjacent selected portions of the optical pattern in alignment therewith, and linear motion of the code member along its length causes light variations which are representative of the distance moved by the code member. Again, irregularities in the surface of the code member or in its alignment can cause a distorted electrical output.

Gap variation in conventional electro-optical transducers is minimized by use of precision bearings, and carefully fabricated code members, and while such transducers are satisfactory for many purposes, their cost limits their broader application. Moreover, the code member-to-reticle gap cannot be maintained by conventional means to the degree necessary in many applications. It is therefore an object of the present invention to provide an accurate and relatively less expensive electro-optical transducer in which a precise gap can be maintained between the code member and reticles.

SUMMARY OF THE INVENTION

In accordance with the present invention, an electro-optical transducer is provided which employs a compliant fluidic mounting structure such that error caused by irregularities in the movement of the code member is substantially minimized. In brief, a movable code member is supported in precise spaced-apart relationship with a stationary member, such as a reticle plate, by a fluidic bearing which can be hydrodynamic or hydrostatic, operative to permit one of the members to follow the spurious movement of the other which may be caused by irregularities in the surface of the code member or in the support structure. The fluidic mounting is relatively inexpensive and an extremely accurate transducer can be constructed according to the invention at a cost substantially lower than conventional transducers of comparable precision.

One well-known transducer employs a ruled disc mounted for rotation on a shaft and one or more reticles disposed about the periphery of the disc in alignment with predetermined portions of the rulings. According to the present invention, the disc and the reticles are relatively supported hydrodynamically or hydrostatically such that irregular axial movement of the disc is tracked by corresponding movement of the reticles thereby to maintain a precise disc-to-reticle gap. The invention is also useful with electro-optical transducers other than the disc type; for example, the invention can be employed with drum type devices wherein the optical pattern is formed on the circumferential surface of the drum, or with linear devices in which an elongated planar scale must be maintained accurately spaced from a reticle for relative motion therewith along the axis of the scale.

DESCRIPTION OF THE DRAWINGS

The invention will be more fully understood from the following detailed description taken in conjunction with the accompanying drawings, in which:

FIG. 1 is a diagrammatic pictorial view of an electro-optical transducer embodying the invention;

FIG. 2 is a diagrammatic cutaway elevation view of the transducer of FIG. 1;

FIGS. 3A, 3B and 3C are diagrammatic elevation views of alternative embodiments of the transducer of FIG. 1;

FIG. 4 is a pictorial view of an embodiment of the invention;

FIG. 5 is a diagrammatic elevation view of a further embodiment of the invention wherein the coded disc is hydrodynamically supported;

FIGS. 6A and 6B are diagrammatic elevation views of a further embodiment of the invention wherein the reticle is supported with respect to the two surfaces of the disc;

FIG. 7 is a diagrammatic elevation view of a variation of FIG. 6;

FIG. 8 is a diagrammatic elevation view of still another embodiment of the invention wherein both the disc and reticles are hydrodynamically supported;

FIG. 9 is a diagrammatic elevation view of a hydrostatically supported electro-optical transducer according to the invention; and FIG. 10 is a diagrammatic pictorial view of a drum-type transducer embodying the invention.

DETAILED DESCRIPTION OF THE INVENTION

The invention as embodied in an electro-optical disc encoder is shown in FIGS. 1 and 2 and includes a disc 10 mounted for rotation on a shaft 12, and a reticle plate 14 compliantly supported in spaced apart relationship to the confronting surface of the disc 10 by a support structure 16. The surface of disc 10 confronting reticle 14 has a circumferential track composed of radial lines 18 and reticle 14 has an aperture 20 optically aligned with the rulings 18. Reticle 14 typically is of a transparent material such as plastic, with an opaque coating 21 formed on the surface thereof confronting disc 10. Aperture 20 is etched or otherwise provided in coating 21. A light source 22 is disposed above reticle 14 and a photodetector 24 is disposed below disc 10 in light receiving relationship with light source 22. Light from source 22 will pass through aperture 20 and thence through the coded pattern on disc 10 and be received by photosensor 24, which will produce a periodically varying electrical output signal in relation to the rotation of disc 10.

To achieve a consistent and distortion-free output signal, the spacing or gap between the confronting surfaces of reticle 14 and disc 10 should be uniformly maintained since variations in this spacing can result in corresponding irregularities in the output signal due to the changing optical path which may be caused by the varying gap. According to the invention, the spacing between the confronting surfaces of the disc and the reticle is precisely maintained by a compliant fluidic support system such that axial variations in one optical member are followed by corresponding variations in the axial movement of the other optical member. Compliant support 16 includes a thin plate 26 supported at respective opposite ends by a rigid mounting 28, reticle plate 14 being attached midway of plate 26. Plate 26 is of a material and configuration to provide a predetermined flexural support of reticle 14. Reticle 14 is slightly inclined with respect to the confronting surface of disc 10 such that a wedge-shaped space exists between disc 10 and reticle 14, the apex of the wedge being in the direction of disc motion as indicated by arrow 30. This wedge-shaped space acts as a hydrodynamic wedge upon movement of disc 10 such that the reticle 14 floats a predetermined distance above the confronting surface of disc 10 as the disc rotates. Axial movement of disc 10, which will either increase or decrease the spacing from reticle 14, is compensated since the floating reticle moves accordingly to maintain a precise gap dictated by the hydrodynamic characteristics of the structure. Thus, by use of a novel compliant fluidic structure, the problems associated with mechanical irregularities in the encoder structure are substantially reduced with the result that highly accurate transducer operation is achieved.

Particular compliant support structures employed with different electro-optical transducers will, of course, depend upon the operating requirements of the individual transducer and details of implementation of the fluidic supports themselves are well known to those versed in the art. Several typical reticle plate constructions which are useful in a hydrodynamically supported electro-optical transducer are illustrated in FIGS. 3A through 3C, the compliant suspension being illustrated diagrammatically as a pair of springs, each mounted at one end to a rigid structure and at the other end to the reticle plate assembly. FIG. 3A shows a pad 32 which is pivotally mounted to a support plate 34 to enable rotation in a plane orthogonal to the plane of disc 10. The face of pad 32 confronting the disc surface can be flat as illustrated, or can be of convex shape. In operation, rotation of disc 10 as indicated by arrow 30, will cause pad 32 to tilt in a counter-clockwise direction to form a hydrodynamic wedge between the confronting surfaces of pad 32 and disc 10, the particular dimensions of the hydrodynamic wedge being governed, of course, by the parameters involved in a particular instance. Axial movement of disc 10 will cause a change in the dimensions of the gap between pad 32 and the disc surface and the elastic support system will permit pad 32 to follow the axial movement to maintain a specified hydrodynamic gap determined by the operating speed of disc 10 and the compliance of the support structure.

FIG. 3B shows another hydrodynamically supported reticle structure employing a Rayleigh step, while FIG. 3C shows yet another embodiment employing a pocket type suspended aperture plate. In general, the hydrodynamically supported plate can be of any form which permits the requisite lift to occur for given operating conditions.

A pictorial view of the invention embodied in a lamp and photosensor assembly of a disc transducer is illustrated in FIG. 4. A housing 31 has a rectangular channel formed therein to accommodate a peripheral portion of a coded disc 33 which is rotatably mounted for movement through this channel. A reticle plate 35 is supported in predetermined spaced-apart relation to the confronting surface of disc 33 by means of a cantilever suspension spring 37 which provides the resilient hydrodynamic support according to the invention. The spring has a common portion 39 fastened to the upper surface of housing 31 and a pair of bifurcated ends 41 respectively secured to opposite edges of reticle 35.

A molded lens 43 is disposed on the upper surface of reticle 35 radially of the disc 33, the lens being in alignment with the reticle aperture and the confronting optical pattern on the periphery of the disc. A lamp 45 is mounted in housing 31 in light transmitting relationship with lens 43 and the associated reticle aperture to suitably illuminate the coded disc pattern to provide the intended transducer operation. One or more photosensors (not shown) are mounted in housing 31 in confronting relationship with the lower surface of disc 33 and are operative to receive light from lamp 45 passing through the optical pattern and to produce in response thereto electrical signals representative of disc motion or of information encoded on the disc. Reticle 35 is inclined toward the confronting surface of disc 33 in the direction of rotation indicated by the arrow, and as discussed hereinabove hydrodynamic action maintains a precise reticle-to-disc gap as disc 33 is rotated relative to the stationary reticle 35.

In a typical disc type transducer according to the invention, having a 5 inch diameter disc rotatable at a speed of 3600 r.p.m., a reticle having a weight of 0.007 lb. is suspended in relation to the confronting surface of the disc with a gap of 0.001 inch by a spring of 10.4 lb./in. stiffness, the overall fluid bearing stiffness being 208 lb./in. The gap can be maintained to an accuracy of ±25% of the intended 0.001 inch value. The reticle plate itself typically is 1/16 inch thick and 3/4 inch square and is angularly disposed with respect to the plane of the code disc with a major and minor gap of 0.0015 inch and 0.0005 inch, the reticle ruling at the center of the reticle plate being spaced 0.001 inch from the disc surface.

FIG. 5 illustrates an embodiment of the invention wherein the reticle plate is rigidly mounted in spaced-apart relation to the coded disc, which is compliantly supported. Reticle plate 40 is illustrated diagrammatically in rigidly supported disposition with respect to the periphery of a disc 42 attached to shaft 44 which is supported by bearing 46 and axially and rotatably movable therein. A compliant support structure including member 48 elastically connected to a rigid mounting 50 engages the center of disc 42 opposite rotatable shaft 44. Upon rotation of disc 42 the disc is maintained in precise spaced-apart relation to reticle 40 by means of a cushion of air therebetween determined by the specific hydrodynamic characteristics of the compliant transducer structure.

FIG. 6 shows an embodiment of the invention wherein the reticle plate is fluidically supported with respect to both sides of a coded disc. Referring to FIG. 6A, the reticle includes a channel-shaped member 50 which encompasses the end portion of a disc 52, member 50 being fluidically supported in accordance with the principles of the invention. As seen more clearly in FIG. 6B, the surfaces of member 50 which confront respective faces of disc 52 are inclined to form respective wedge-shaped gaps 51 and 53 with the disc. A lens 54 is mounted below plate 50B. Since the lens and photocell are mounted integrally with the reticle plates, movement of the reticles within its elastic support also allows movement of the optical components so that the optical path is undisturbed.

FIG. 7 illustrates an embodiment of the invention wherein the disc is axially as well as radially supported by means of fluidic bearings. Diametrically opposite portions of disc 60 are disposed within channel-shaped reticle heads 62 and 64, each head being operative upon rotation of disc 60 to define a gap between the inner surfaces of the head and the confronting circular and circumferential surfaces of disc 60. Rotation of disc 60 at a predetermined velocity will cause each reticle head to float on an air cushion to define a precise gap both radially and axially of disc 60. Alternatively, reticle heads 62 and 64 can be rigidly mounted, with disc 60 compliantly mounted for rotation within the reticle heads.

FIG. 8 illustrates an electro-optical transducer wherein both the rotating disc member and the reticle plates are fluidically supported. A stationary member 70 is elastically supported from a mounting structure 72 by means of a flexible coupling 71. This coupling, which may be of bellows configuration, provides compliance axially while being substantially rigid torsionally. A rotatable shaft 74 is slidably and rotatably disposed within the central portion of member 72, and a portion of shaft 74 cooperates with the central portion of member 70 to form a fluidic bearing which is operative to align shaft 74 both axially and radially with respect to non-rotating member 70. Thus, rotating disc 76 attached to shaft 74 is accurately maintained in axial and radial alignment as it is rotated during operation of the transducer.

A pair of reticle plates 78 and 80 are each elastically supported from respective portions of stationary member 70 in spaced-apart relation to respective surfaces of disc 76. As described hereinabove, upon rotation of disc 76 reticle plates 78 and 80 will be maintained hydrodynamically a precise distance above the confronting disc surface and, by operation of the hydrodynamic disc support, disc 76 will also be axially and radially maintained in precise alignment. The present structure is especially useful to maintain the reticle plates in accurate concentric relationship to the coded pattern formed on disc 76.

The invention has been described hereinabove in conjunction with hydrodynamically supported transducer members, but it will be appreciated that the transducers can also be hydrostatically supported. One such hydrostatic support is illustrated in FIG. 9 and includes a reticle plate 84 elastically suspended from a rigid mount 86 in confronting relationship with a surface of code member 88. The code member can be a disc, drum or linear member according to the type of transducer in which the hydrostatic bearing is employed. A pair of gas ports 90a and 90b are formed through plate 84, each terminating in a respective cylindrical opening 92a and 92b which confronts a surface of code member 88. Pressurized gas from a suitable source (not shown) is applied to ports 90a and 90b, the gas flowing out of chambers 92a and 92b to provide a gas cushion which maintains reticle plate 84 in a predetermined spaced apart relationship with member 88, depending upon the physical configuration of the hydrostatic support and the particular gas pressure. It will be noted that fluidic support can be achieved by this hydrostatic structure without movement of member 88, in contrast to the hydrodynamic support described hereinabove wherein relative motion between the code member and the reticle is required to achieve the intended compliant support.

The invention as embodied in an electro-optical transducer of the drum type is illustrated in FIG. 10 and includes an optical code pattern 93 formed on the circumferential surface of a rotatable drum 94, a reticle plate 96 being compliantly supported above the circumferential surface of drum 94. Reticle plate 94 can be of any of the configurations described hereinabove and is illustrated schematically as a generally rectangular plate supported at opposite sides by springs 97. As in the embodiments described hereinabove, reticle plate 96 floats on a gas cushion a predetermined distance above the confronting surface of drum 94 such that an accurate gap between the code pattern and the reticle is maintained without regard to irregularities in the radial movement of the drum such as may be caused by eccentricity of the drum with respect to its shaft, or irregularities in the circularity of the drum surface.

Various modifications and alternative implementations of the invention will occur to those versed in the art without departing from the spirit and true scope hereof. Accordingly, it is not intended to limit the invention by what has been particularly shown and described except as indicated in the appended claims.

What is claimed is:

1. An electro-optical transducer comprising:
   a code member having an optical pattern formed thereon;
   a reticle disposed in optical alignment with a portion of said optical pattern;
   means for providing relative movement between said code member and said reticle;
   fluid controlled means for maintaining said code member and said reticle in precise spaced-apart relationship in the presence of spurious relative movement therebetween;
   a source of light disposed in light transmitting relationship with said reticle and operative to illuminate a selected portion of said confronting optical pattern; and
   a photosensitive detector operative to receive light passing through said optical pattern and to produce in response to the received light an electrical signal representative of the position of said code member relative to said reticle.

2. An electro-optical transducer comprising:
   a code member having an optical pattern formed thereon;
   a reticle disposed in optical alignment with a portion of said optical pattern;
   means for providing relative movement between said code member and said reticle;
   a compliant support structure including fluid means operative to maintain a predetermined gap between said code member and said reticle in the presence of spurious motion therebetween;

a source of light disposed in light transmitting relationship with said reticle and operative to illuminate a selected portion of said confronting optical pattern; and a photosensitive detector operative to receive light passing through said optical pattern and to produce in response to the received light an electrical signal representative of the position of said code member relative to said reticle.

3. A transducer according to claim 2 wherein said compliant support includes spring means supporting said reticle in spaced apart relation to said code member and operative to permit motion orthogonal to the plane of said member.

4. An electro-optical transducer comprising:

a rotatable code member having an optical pattern formed thereon;

a reticle disposed in spaced-apart relationship with said code member and in optical alignment with a portion of said optical pattern confronting said reticle;

a source of light operative to illuminate said reticle and said confronting portion of said optical pattern;

a photosensitive detector operative to receive light passing through said pattern and said reticle, and to produce in response to the received light an electrical signal whose magnitude varies in accordance with the rotatable position of said code member; and a compliant fluidic mounting operative to permit movement of said reticle in a direction orthogonal to the plane of said code member and operative to follow irregular movement of said code member thereby to maintain a predetermined gap between said member and said reticle.

5. The transducer according to claim 4 wherein said mounting includes a reticle plate containing said reticle and hydrodynamically supported in precise spaced-apart relation to said code member when said code member is rotated at a predetermined speed.

6. The transducer according to claim 5 wherein said mounting includes spring means compliantly supporting said reticle plate in spaced-apart relation to said code member.

7. The transducer according to claim 4 wherein said compliant fluidic mounting is a hydrodynamic structure operative to maintain a predetermined gap between said code member and said reticle when said code member rotates at a specified speed.

8. The transducer according to claim 4 wherein said compliant fluidic mounting is a hydrostatic structure operative to maintain a predetermined gap between said code member and said reticle.

References Cited

UNITED STATES PATENTS

| | | | |
|---|---|---|---|
| 2,351,955 | 6/1944 | Graf | 250—231 X |
| 2,378,526 | 6/1945 | Agnew | 250—231 X |
| 3,268,877 | 8/1966 | Hagen | 179—100.2 X |
| 3,305,931 | 2/1967 | Kerr | 250—237 X |
| 3,310,792 | 3/1967 | Groom et al. | 340—174.1 |

OTHER REFERENCES

Khoury: IBM Technical Disclosure Bulletin, vol. 4, No. 5, October 1961, p. 78.

WALTER STOLWEIN, Primary Examiner

U.S. Cl. X.R.

250—237; 356—250